US006981520B2

(12) United States Patent
Sherman et al.

(10) Patent No.: US 6,981,520 B2
(45) Date of Patent: Jan. 3, 2006

(54) MICROVALVE FOR CONTROLLING FLUID FLOW

(75) Inventors: Faiz Feisal Sherman, West Chester, OH (US); Vladimir Gartstein, Cincinnati, OH (US); Daniel Jonathan Quiram, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 92 days.

(21) Appl. No.: 10/923,177

(22) Filed: Aug. 19, 2004

(65) Prior Publication Data

US 2005/0016605 A1 Jan. 27, 2005

Related U.S. Application Data

(62) Division of application No. 10/048,082, filed as application No. PCT/US00/19785 on Jul. 24, 2002.
(60) Provisional application No. 60/175,152, filed on Jan. 7, 2000, and provisional application No. 60/146,625, filed on Jul. 30, 1999.

(51) Int. Cl.
    *F16K 11/10* (2006.01)

(52) U.S. Cl. .................... 137/625.33; 251/113
(58) Field of Classification Search .......... 251/89, 251/113; 137/625.28, 625.33
    See application file for complete search history.

(56) References Cited

U.S. PATENT DOCUMENTS

| | | | |
|---|---|---|---|
| 2,468,430 | A | 4/1949 | Derksen |
| 3,838,299 | A | 9/1974 | Elkuch |
| 4,177,327 | A | 12/1979 | Mathews et al. |
| 4,913,983 | A | 4/1990 | Cheiky |
| 5,054,522 | A | 10/1991 | Kowanz et al. |
| 5,178,190 | A | 1/1993 | Mettner |
| 5,304,431 | A | 4/1994 | Schumm, Jr. |
| 5,400,824 | A | 3/1995 | Gschwendtner et al. |
| 5,449,569 | A | 9/1995 | Schumm, Jr. |
| 5,541,016 | A | 7/1996 | Schumm, Jr. |
| 5,631,514 | A | 5/1997 | Garcia et al. |
| 5,837,394 | A | 11/1998 | Schumm, Jr. |
| 6,074,775 | A | 6/2000 | Gartstein et al. |
| 6,163,131 | A | 12/2000 | Gartstein et al. |

FOREIGN PATENT DOCUMENTS

| | | |
|---|---|---|
| EP | 0 829 649 A2 | 3/1998 |
| WO | WO 99/16096 A1 | 4/1999 |
| WO | WO 99/37013 A1 | 7/1999 |
| WO | WO 01/09519 A1 | 2/2001 |
| WO | WO 01/09521 A1 | 2/2001 |

OTHER PUBLICATIONS

Ernest J. Garcia and Jeffry J. Sniegowski, "Surface Micromachined Microengine," Elsevier Science S.A., Feb. 7, 1995, pp. 203–214.
Faiz Sherman, et al, "In–Plane Microactuator for Fluid Control Application," The Eleventh Annual International Workshop on Micro Electro Mechanical Systems, Jan. 1998.
Lee A. P. et al, "Polysilicon Angular Microvibromotors," Journal of Microelectromechanical Systems, Jun. 1, 1992, pp. 70–76, vol. 1, No. 2, New York.
Tien N. C. et al, "Impact–Actuated Linear Microvibromotor for Micro–Optical Systems On Silicon," Technical Digest of the International Electron Devices Meetings, Oct. 22, 1995, pp. 924–926, vol. Meeting 40, New York.

*Primary Examiner*—John Fox
(74) *Attorney, Agent, or Firm*—Peter D. Meyer

(57) ABSTRACT

A microvalve for controlling fluid flow, including a body portion having a plurality of spaced openings formed therein, a shutter located adjacent to and substantially parallel with the body portion having a plurality of spaced openings formed therein, a drive mechanism for causing the shutter to move laterally with respect to the body portion so that the spaced openings of the shutter are brought into and out of alignment with the spaced openings of the body portion, wherein the microvalve is in an open position and a closed position, respectively, and, a latching mechanism for preventing the shutter from moving laterally with respect to the body portion.

16 Claims, 12 Drawing Sheets

MICROVALVE FOR CONTROLLING FLUID FLOW

CROSS-REFERENCE TO RELATED APPLICATION

This application is a divisional of Ser. No. 10/048,082, filed Jan. 24, 2002, which claims priority to and is a 371 of PCT/US 00/19785 filed Jul. 24, 2002, which claims the benefit of 60/175,152, filed Jan. 7, 2000, and the benefit of 60/146,625, filed Jul. 30, 1999.

FIELD OF THE INVENTION

This invention relates to a microvalve for controlling fluid flow, and more particularly, to a latching system utilized with such microvalve.

BACKGROUND OF THE INVENTION

Microvalves employed to control the flow of fluid are presently in use, with several designs falling within a class known as micro electromechanical systems or "MEMS." It will be appreciated that such microvalves are preferably driven thermally or electrostatically. In either case, slots or other types of openings are placed in an open or closed position, respectively, preferably within a shutter-type configuration so as to permit or prevent fluid from flowing therethrough. Accordingly, the greatest amount of opening can be accomplished by a minimal amount of movement.

It has been determined, however, that the prior art microvalves have an undesirable amount of power drain associated therewith. This is because the power required to open the microvalve must be maintained in order to keep it in the open position. By latching the movable portion of a microvalve shutter in the open position, the need for continuous power thereto would be eliminated. One example of latching is disclosed in U.S. Pat. No. 5,837,394 to Schumm, Jr., where a detent or ratchet is provided to assist in holding a sliding portion of a semiconductor microactuator in either the open or closed position. As seen therein, though, separate actuators are utilized to move the sliding portion in each direction. In this way, the actuators must overcome the resistance provided by the detent/ratchet so that the sliding portion is able to move into the desired position. This clearly requires a greater force from the actuators, and therefore a greater amount of power to the actuators. Further, it will be seen that the '394 patent relates specifically to electrically activated, thermally responsive semiconductor valves that include and contain a cantilever deformable element which deforms on heating by electrical resistance.

It will further be appreciated that while microvalves of the type disclosed herein may be utilized in any number of environments, one specific application has been in the field of metal-air batteries. Metal-air batteries have decided advantages over other types of electrochemical cells such as typical alkaline (zinc/manganese dioxide) or lithium batteries. The metal-air batteries utilize a gas reactant, such as oxygen or air, which does not have to be stored in the battery like a solid reactant. The gas reactant may enter the cell through vents or holes in the battery case. Thus, metal-air batteries are able to provide a higher energy density (watts per unit mass) that may result in a relatively higher power output and a relatively lower weight. This is particularly useful in applications in which a small, light battery is desired so that more energy is provided in the same size package or the same amount of energy in a smaller package. Metal-air batteries are also environmentally safe and generally leakage-free.

Metal-air batteries are comprised of one or more electrochemical cells. Each cell typically includes a metal anode and an air cathode with a separator electrically isolating the two, where an electrolyte is present, in the anode, cathode and separator. The metal anode usually comprises a fine-grained metal powder, such as, but not limited to, zinc, aluminum or magnesium, blended together with an aqueous electrolyte, such as potassium hydroxide, and a gelling agent into a paste. The air cathode is a catalytic structure designed to facilitate the reduction of oxygen and typically comprises active carbon, a binder and a catalyst, which are formed into a sheet together with a metal current collector. The air cathode also commonly incorporates a hydrophobic polymer, such as polytetrafluoroethylene or polypropylene, directly into the cathode sheet and/or as a coextensive film. The hydrophobic polymer prevents the electrolyte from passing through the cathode and leaking from the cell.

In a metal-air battery, oxygen, through a series of reactions, reacts with the metal in the cell producing electrical current. In a zinc-air cell, for example, oxygen enables a charge/discharge reaction at the cathode (positive electrode):

$$\tfrac{1}{2}O_2 + H_2O + 2e^- \leftrightarrows 2OH^-.$$

Meanwhile, a charge/discharge reaction occurs at the anode (negative electrode):

$$Zn + 2OH^- \leftrightarrows ZnO + H_2O + 2e^-.$$

Hence, the zinc-air cell has an overall reaction:

$$Zn + \tfrac{1}{2}O_2 \leftrightarrows ZnO.$$

Typically, metal-air batteries utilize ambient air, which contains approximately 21% oxygen, as the reactant for the cells. The ambient air enters through ventilation holes in the housing. In the housing, the oxygen in the ambient air reacts with the cells. The oxygen-depleted air then exits the housing. Thus, ambient air enters or is drawn into the housing in a flow sufficient to achieve the desired power output.

Free flow of ambient air through the metal-air cell, however, creates several problems that may lower the efficiency of a metal-air cell or even cause the cell to fail prematurely. First, ambient air that enters the electrochemical cell will continue to react with the anode regardless of whether the cell is providing electrical energy to a load. Thus, the capacity of the cell will continue to decrease unless air is excluded while the cell is not providing electrical energy to a load. Another problem with allowing free flow of ambient air as the reactant is the difficulty in maintaining the proper humidity in the battery. Equilibrium vapor pressure of the metal-air battery results in an equilibrium relative humidity that is typically about 50–60%. If the ambient humidity is greater than the equilibrium relative humidity value for the metal-air battery, the metal-air battery will absorb water from the air through the cathode and fail due to a condition called flooding, which may also cause the battery to leak. If the ambient humidity is less than the equilibrium relative humidity value for the metal-air battery, the metal-air cells will release water vapor from the electrolyte through the air cathode and fail due to drying out. Further; impurities such as carbon dioxide ($CO_2$) present in the ambient air may decrease the energy capacity of the cell. Thus, a metal-air cell will operate more efficiently and longer if the flow of ambient air is controlled so that the air enters the cell only when the cell is providing electrical energy to a load.

Air exchange control systems for metal-air batteries have been designed to control the flow of ambient air into and out of metal-air cells for the following reasons: (1) to prevent the cell from continuing to react; (2) to prevent changes in the cell humidity; and, (3) to prevent $CO_2$ from entering the cell when the battery is not providing electrical energy to a load. Some designs, for example, use a mechanism physically operated by the user where a valve or vent cover is attached to a switch that turns an electrical device "on" so that when the switch moves, the cover moves. See, e.g., U.S. Pat. No. 2,468,430, issued to Derksen on Apr. 26, 1949; U.S. Pat. No. 4,913,983 entitled "Metal-Air Battery Power Supply" and issued to Cheiky on Apr. 3, 1990; and, H. R. Espig & D. F. Porter, Power Sources 4: Research and Development in Non-Mechanical Electrical Power Sources, Proceedings of the $8^{th}$ International Symposium held at Brighton, September 1972 (Oriel Press) at p. 342. In these designs, however, the air exchange system requires the physical presence of the operator and an electrical device that has a switch compatible with the battery air exchange system.

Automatic air exchange systems that are contained within the battery and operate without the presence of a user, however, typically provide significant parasitic drains on the energy capacity of the cell that may also shorten the life of the cell. One design, such as the one disclosed in U.S. Pat. No. 4,177,327 entitled "Metal-Air Battery Having Electrically Operated Air Access Vent Cover" and issued to Mathews et al. on Dec. 4, 1979, utilizes a vent cover associated with an electrically operated bimetallic actuator to close the air access vents when the battery was not in use to prevent ambient air from entering the housing when the battery is not in use. This is accomplished by applying a current to the bimetallic actuator so that the two materials thereof heat up, whereby the different thermal expansion coefficients thereof cause the system to bend up or down. The electrical actuator, however, provides a substantial parasitic drain on the metal-air cells and diminishes the life of the cell.

Additionally, U.S. Pat. No. 5,304,431 entitled "Fluid Depolarized Electrochemical Battery with Automatic Valve" and issued to Brooke Schumm, Jr. on Apr. 19, 1994; U.S. Pat. No. 5,449,569 entitled Fluid Depolarized Battery with Improved Automatic Valve" and issued to Brooke Schumm, Jr. on Sep. 12, 1995; and U.S. Pat. No. 5,541,016 entitled "Electrical Appliance with Automatic Valve Especially for Fluid Depolarized Electrochemical Battery" and issued to Brooke Schumm, Jr. on Jul. 30, 1996, disclose a design incorporating a thermally responsive semiconductor microactuator disposed over a fluid entrance inlet to permit ambient air to enter the cell when the battery is supplying electrical power to a load. In this design, electrical energy on the order of milliwatts is dissipated to heat a resistive element that opens a thermally responsive valve and keeps that valve open while the battery is in use. Thus, as described hereinabove with respect to the '394 patent, the design also provides a continuous parasitic drain on the cell that decreases the life of the cell.

Therefore, there exists a need for a microvalve, particularly one utilized as an air exchange system in a metal-air battery, that minimizes the parasitic drain on the cell. There also exists a need to minimize the size of microvalves used with a metal-air battery so that it fits within a standard battery package and maximizes the volume of the battery that is available for providing electrical energy. It is also desirable that such microvalves be mass produced to decrease costs, as well as enable large numbers of batteries to be assembled containing them as an air exchange system.

SUMMARY OF THE INVENTION

In a first embodiment of the present invention, a microvalve for controlling fluid flow is disclosed as including: a body portion having a plurality of spaced openings formed therein; a shutter located adjacent to and substantially parallel with the body portion, the shutter having a plurality of spaced openings formed therein; a drive mechanism for causing the shutter to move laterally with respect to the body portion so that the spaced openings of the shutter are brought into and out of alignment with the spaced openings of the body portion, wherein the microvalve is in an open position and a closed position, respectively; and, a latching mechanism for preventing the shutter from moving laterally with respect to the body portion.

In a second embodiment of the present invention, a method of electrostatically actuating a microvalve between a first position and a second position is disclosed, wherein the microvalve includes a shutter located adjacent a body portion, comprising the following steps: disengaging a latching mechanism so as to permit movement of the shutter with respect to the body portion; actuating a drive mechanism to move the shutter from the first position to the second position with respect to the body portion; and, engaging the latching mechanism so as to prevent movement of the shutter from the second position.

In a third embodiment of the present invention, a fluid-breathing voltaic battery is disclosed as including a container, a voltaic cell disposed within the container, and a fluid exchange system. The fluid exchange system further includes a microvalve having a first state and a second state, wherein the microvalve is disposed in the container such that the microvalve is adapted to allow a fluid into the cell when the microvalve is in the first state and to substantially prevent the fluid from flowing into the cell when the microvalve is in the second state, and a controller electrically connected to the microvalve, wherein the controller is adapted to initiate a change of state in the microvalve.

In a fourth embodiment of the present invention, a method of fabricating an electrostatic microvalve is disclosed as including the following steps: providing a first wafer having a top surface and a bottom surface; providing a masking material on the top surface of the first wafer; providing a second wafer having a top surface and a bottom surface; etching a plurality of spaced openings on the top surface of said second wafer; bonding the bottom surface of the first wafer to the top surface of the second wafer via a sacrificial layer; etching the masking material of the first wafer to create a shutter and a plurality of actuators operative therewith; etching a portion of the second wafer so as to create a passage in flow communication with the spaced openings etched on the top surface thereof; and, removing a portion of the sacrificial layer between the first and second wafers to release the actuators.

In a fifth embodiment of the present invention, an electrostatic microvalve is disclosed as including: a first wafer having a masking material on a top surface thereof, wherein the top surface is etched to create a shutter, a plurality of actuators operative with the shutter, and a latching mechanism to prevent movement of the shutter; a second wafer having a plurality of spaced openings etched on a top surface thereof, wherein a portion of the second wafer in substantial alignment with the spaced openings is etched therefrom so as to create a passage in flow communication therewith; and, a sacrificial layer positioned between the first and second wafers to bond the first and second wafers, the sacrificial layer having a portion removed in substantial alignment with the flow passage so as to release the actuators.

BRIEF DESCRIPTION OF THE DRAWINGS

While the specification concludes with claims particularly pointing out and distinctly claiming the subject matter that is regarded as the present invention, it is believed that the invention will be better understood from the following description, which is taken in conjunction with the accompanying drawings:

DETAILED DESCRIPTION OF THE INVENTION

A preferred embodiment of the present invention involves an electrostatically-driven MEMS microvalve designed to control fluid flow. In this application, the term "electrostatically-driven" refers to a driving mechanism created from fixed charge due to an electrostatic potential between two surfaces. This differs from a "thermally-driven" microvalve in that the thermally-driven microvalve utilizes a resistive element that provides the heat energy necessary to drive the valve. Such a resistive element either provides a parasitic drain on the cell itself or requires an alternative power source to drive the valves. Magnetic or inductive systems, by contrast, use continuous current in a loop to generate an external magnetic field which in turn creates a magnetic force. An electrostatic valve, however, utilizes the charge of the cell to drive the valve so that the parasitic drain on the cell is much less than for thermal or magnetic valves.

Figure 1:
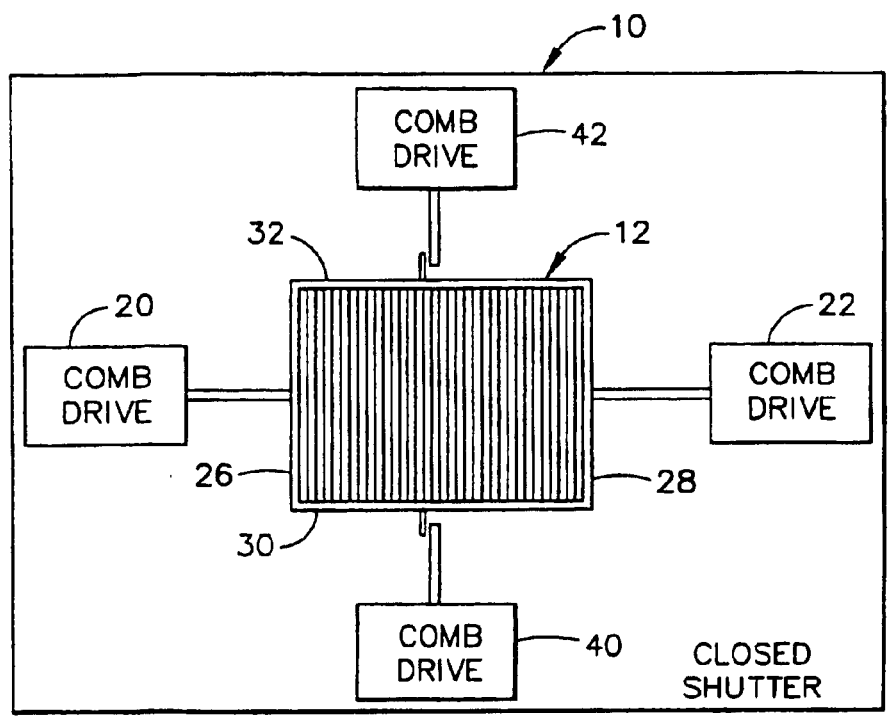
FIG. 1 is a schematic top view of a microvalve employing a mechanical latch design in accordance with the present invention.
Figure 13:
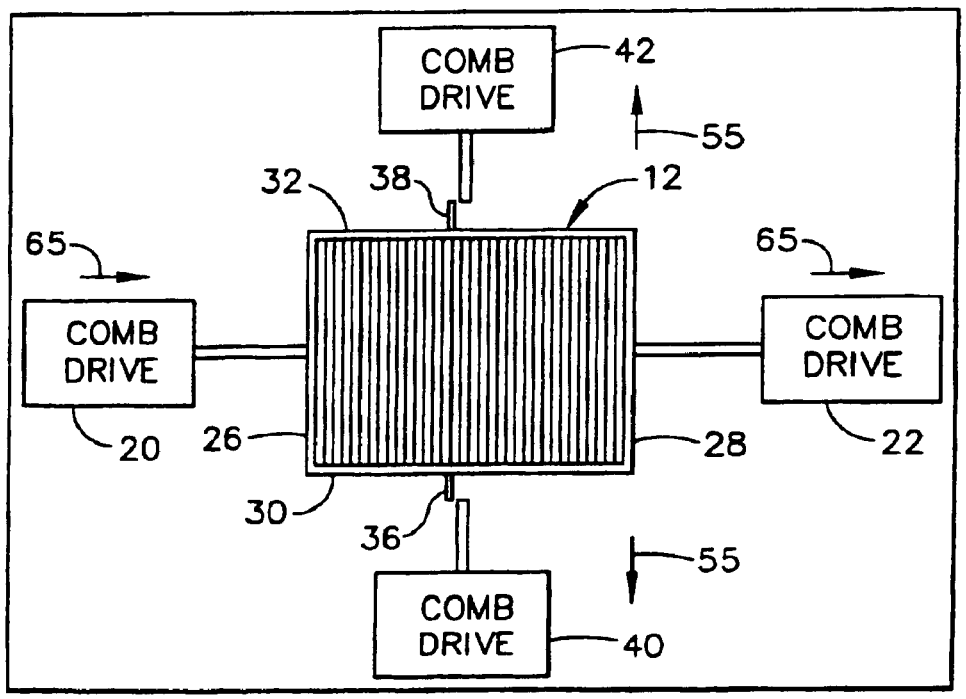
FIG. 13 is a schematic top view of the microvalve depicted in FIG. 1 when in the unlatched, closed position.

In the preferred embodiments, the microvalve is designed to consume power only during transients, i.e., while changing states from open to closed or vice versa. More specifically, it will be seen in FIG. 1 that a microvalve, denoted generally by reference number 10, preferably includes a shutter 12 located adjacent to and substantially parallel with a body portion 14 (see FIGS. 6–11), where shutter 12 and body portion 14 each preferably have a plurality of spaced openings 16 and 18, respectively, formed therein. It will further be seen that microvalve 10 includes a drive mechanism, preferably in the form of electrostatic comb drives 20 and 22, to move shutter 12 laterally with respect to body portion 14 so that spaced openings 16 of shutter 12 are brought into and out of alignment with spaced openings 18 of body portion 14, wherein microvalve 10 is in an open position and a closed position, respectively. It will be appreciated that the lateral movement of shutter 12 is preferably linear, as indicated by arrows 65 in FIGS. 13 and 14. As discussed in greater detail herein, lateral movement of the shutter with respect to a body portion may be non-linear (i.e., rotational) depending upon the configuration of the shutter, the slotted openings in the shutter and the body portion, and the drive mechanism. Further, the drive mechanism may alternatively comprise a thermal, magnetic or piezoelectric driving mechanism as is known in the art.

Figure 2:
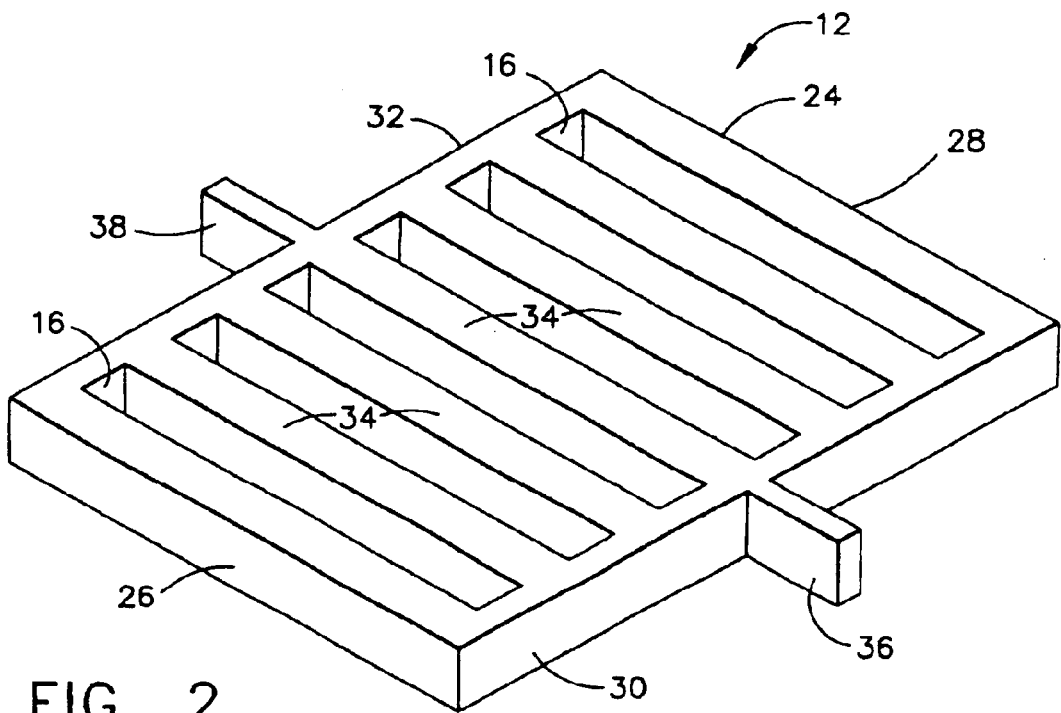
FIG. 2 is an enlarged, perspective view of the microvalve shutter depicted in FIG. 1.

Shutter 12 preferably has a substantially rectangular frame 24 having sides 26 and 28 substantially parallel to spaced openings 16 therein and sides 30 and 32 substantially perpendicular to spaced openings 16, as best seen in FIG. 2. Electrostatic comb drives 20 and 22 are affixed to shutter frame sides 26 and 28, respectively. Shutter 12 further includes a plurality of spaced finger-like members 34 extending between frame sides 30 and 32 to preferably define elongated slots as spaced openings 16 therebetween. It will be noted that members 34 are of a linear configuration so as to provide linear slots. In this way, a large valve opening may be obtained by moving shutter 12 a relatively short distance. Such a design minimizes the power necessary to drive microvalve 10 by minimizing the distance shutter 12 needs to be displaced. This, in turn, allows the use of electrostatic driving technologies such as MEMS when the power required to drive microvalve 10 is lowered to a level that may be practically delivered by these technologies.

Figure 3:
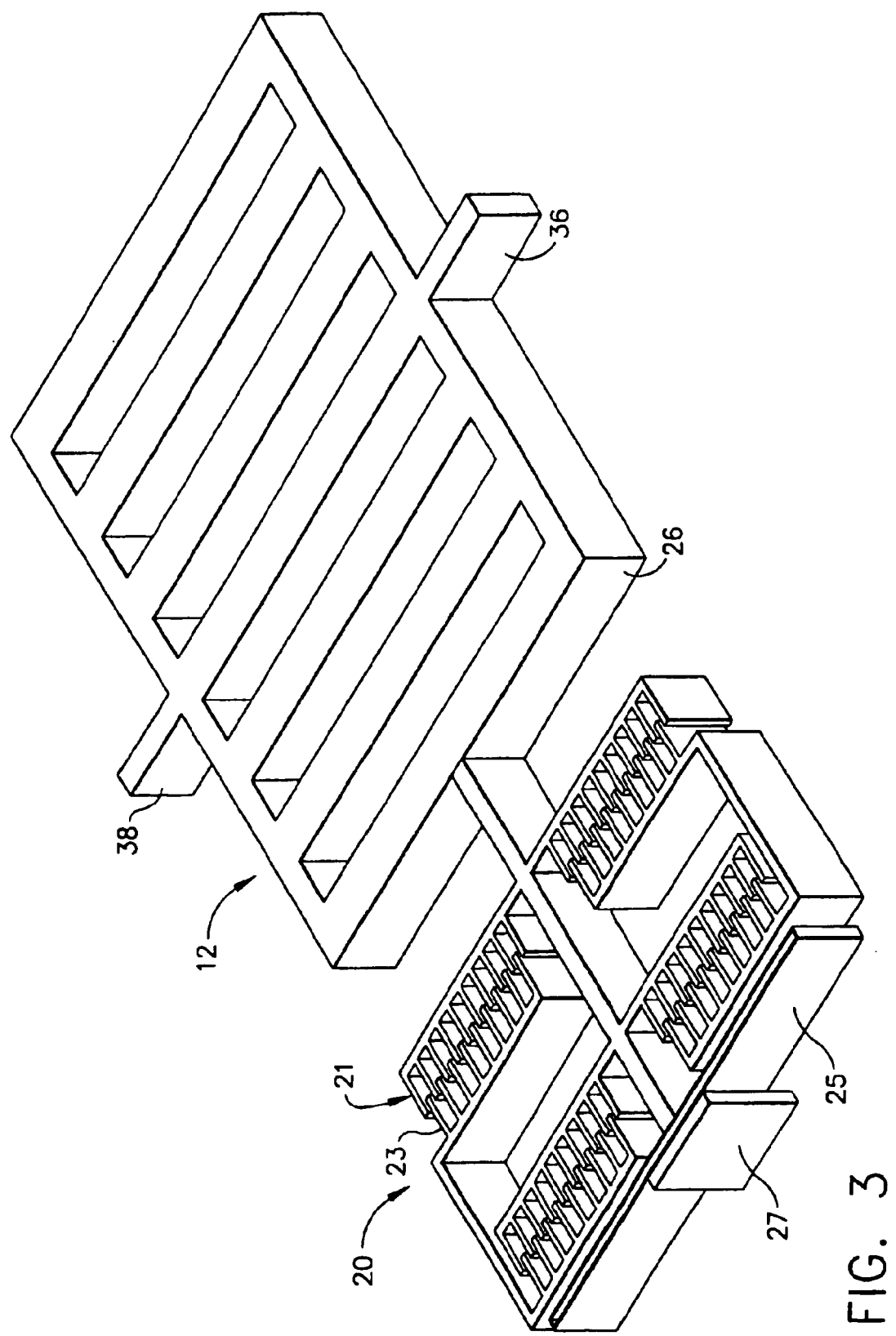
FIG. 3 is an enlarged, perspective view of a first type of comb drive attached to the shutter as depicted in FIG. 1.

It will be understood from FIG. 3 that electrostatic comb drives 20 and 22 of the drive mechanism interface with shutter 12 so as to keep shutter 12 suspended above body portion 14. Each electrostatic comb drive 20 and 22 further includes (as shown for electrostatic comb drive 20 only) a plurality of suspended ground fingers 21 and a plurality of anchored fingers 23, wherein ground fingers 21 are pulled to anchored fingers 23 when a potential is applied therebetween to create an electrostatic force. Further, a set of resilient beams 25 are provided at an anchored end 27 of each electrostatic comb drive 20 and 22 so as to suspend shutter 12 at frame sides 26 and 28. In this way, shutter 12 is able to move between the open and closed positions absent any friction forces thereon. In this application, the term "resilient beams" refer to mechanical structures that undergo displacement so as to provide a spring-like restoring force on the whole system.

Figure 4:
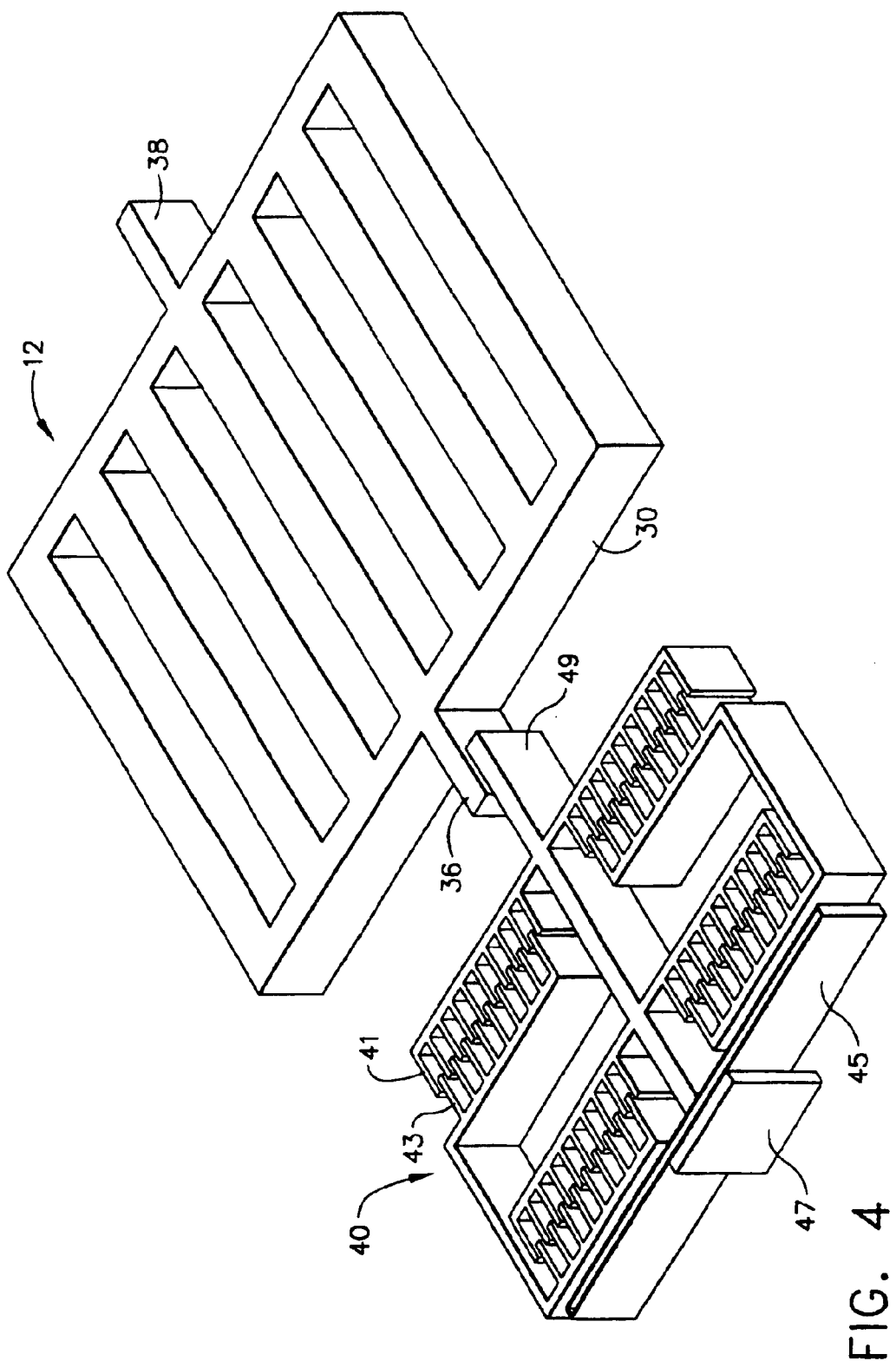
FIG. 4 is an enlarged, perspective view of a second type of comb drive in proximate location to the shutter as depicted in FIG. 1.

Microvalve 10 also includes a latching mechanism for preventing shutter 12 from moving laterally with respect to body portion 14. In one embodiment, the latching mechanism preferably includes ears 36 and 38 extending from frame sides 30 and 32, respectively, and electrostatic comb drives 40 and 42 positioned adjacent frame sides 30 and 32 which are movable so as to engage and disengage ears 36 and 38 and thereby mechanically prevent and permit shutter 12 from moving, respectively. Of course, only one ear and corresponding electrostatic comb drive may be required to prevent lateral movement of shutter 12. It will be appreciated from FIG. 4 that electrostatic comb drives 40 and 42 likewise include (as shown for electrostatic comb drive 40 only) a plurality of suspended ground fingers 41 and a plurality of anchored fingers 43, wherein ground fingers 41 are pulled to anchored fingers 43 when a potential is applied therebetween to create an electrostatic force. In this way, a beam 49 is brought into and out of engagement with ears 36 and 38. A set of resilient beams 45 are also provided at an anchored end 47 of each electrostatic comb drive 40 and 42.

Figure 5:
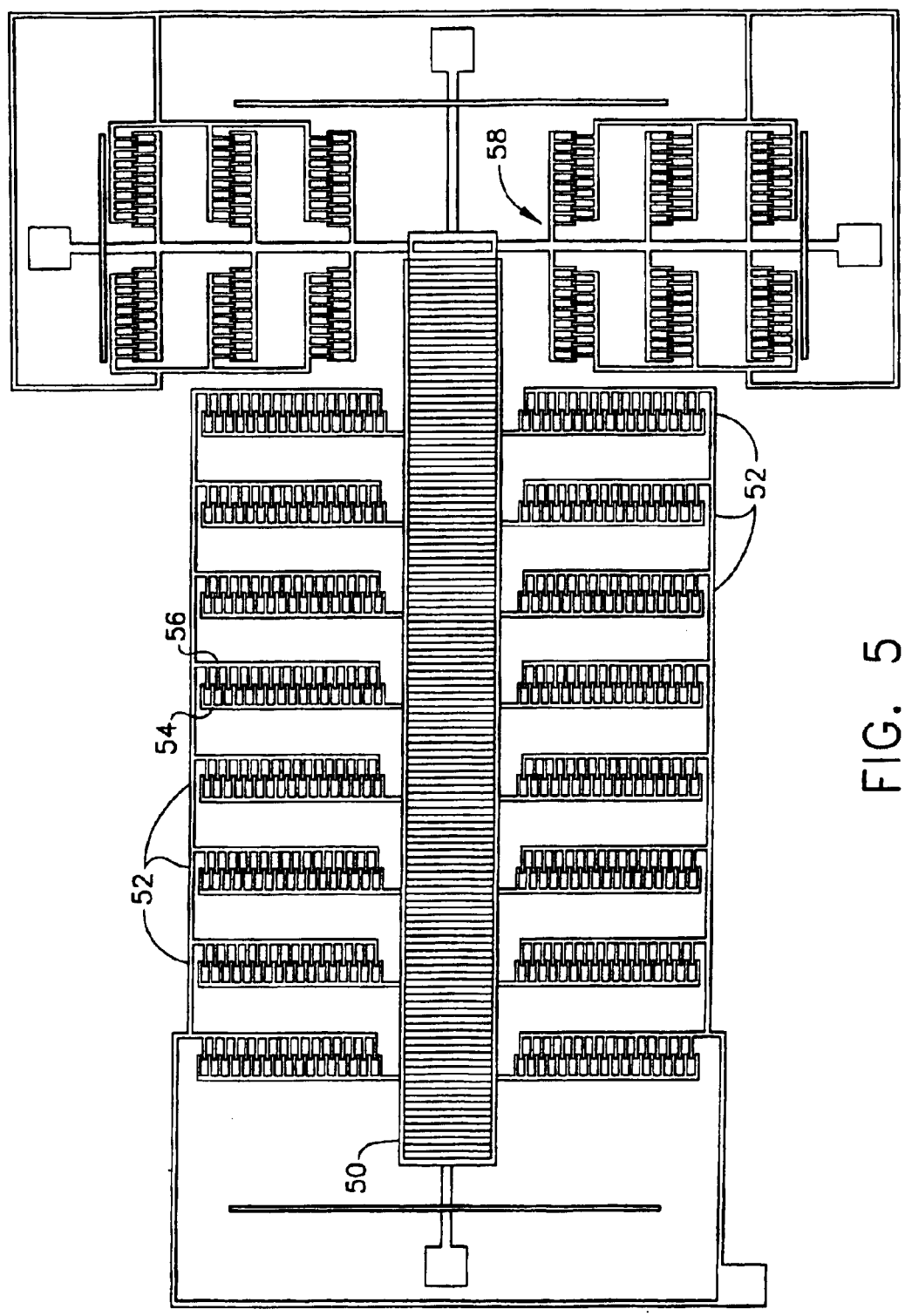
FIG. 5 is a top view of the layout for a microvalve in accordance with the present invention employing a friction latch design.
Figure 6:
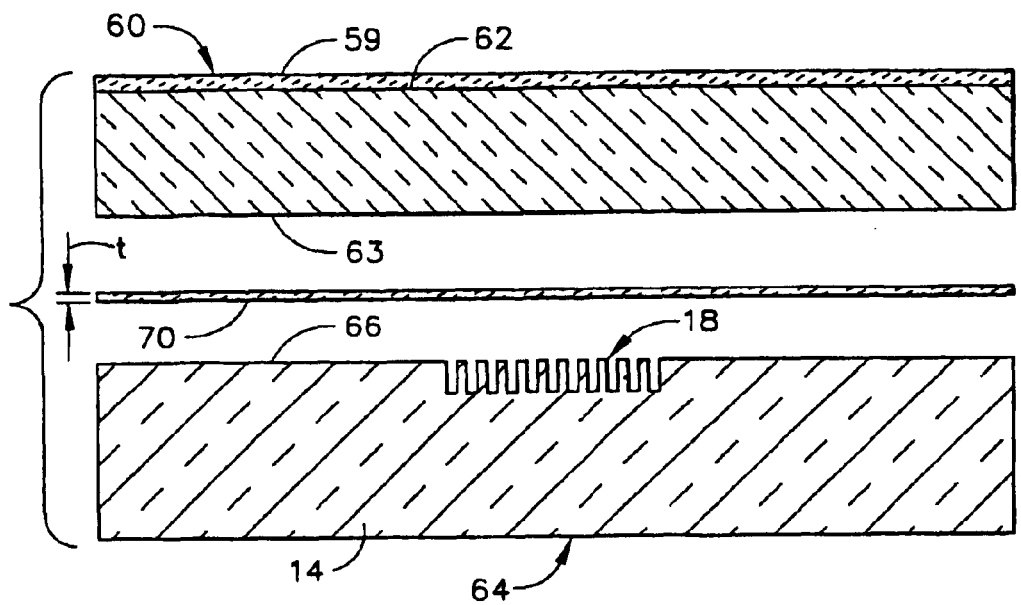
FIG. 6 is an exploded, schematic cross-sectional view of a pair of wafers used in accordance with a process to fabricate the microvalve of the present invention.
Figure 7:
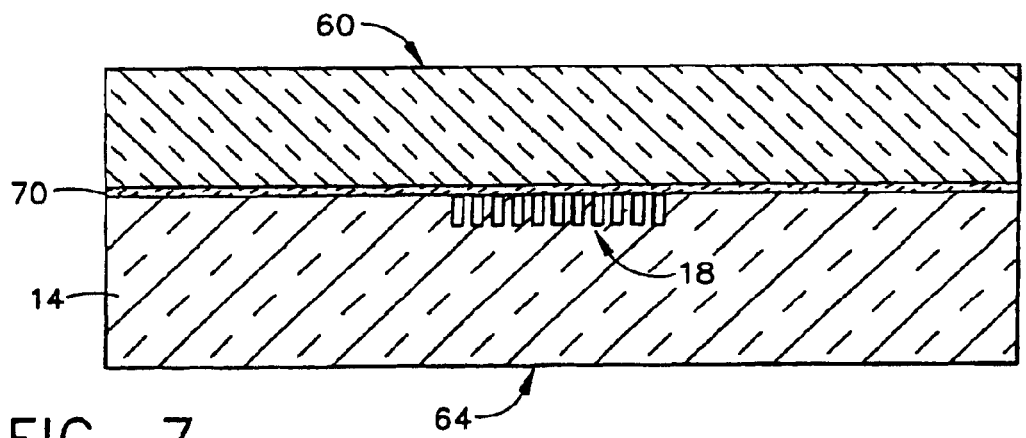
FIG. 7 is a schematic cross-sectional view of the wafers depicted in FIG. 6 which have been bonded together.
Figure 8:
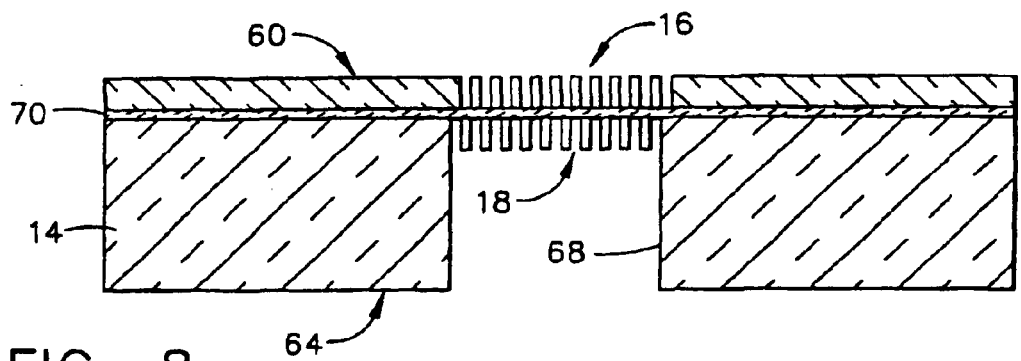
FIG. 8 is a schematic cross-sectional view of the wafers depicted in FIG. 7 after slotted openings are etched in the top and bottom wafers, a flow passage substantially aligned therewith is etched in the second wafer, and the top wafer has been thinned and polished.
Figure 9:
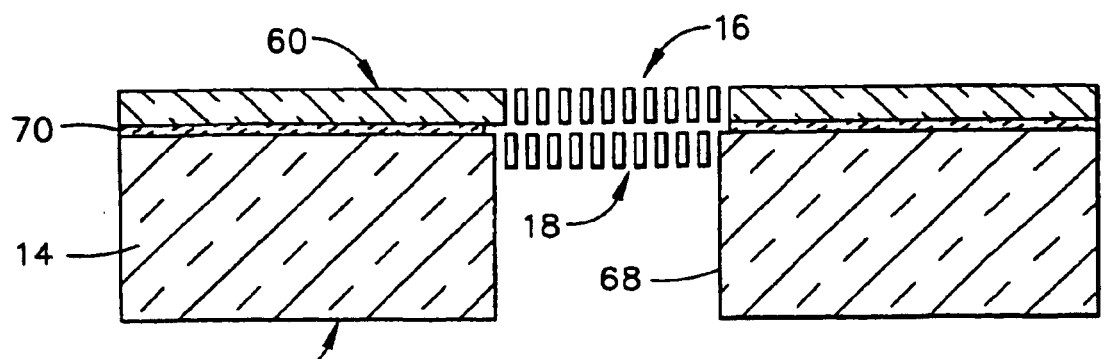
FIG. 9 is a schematic cross-sectional view of the wafers depicted in FIG. 8 after the sacrificial layer is removed.
Figure 10:
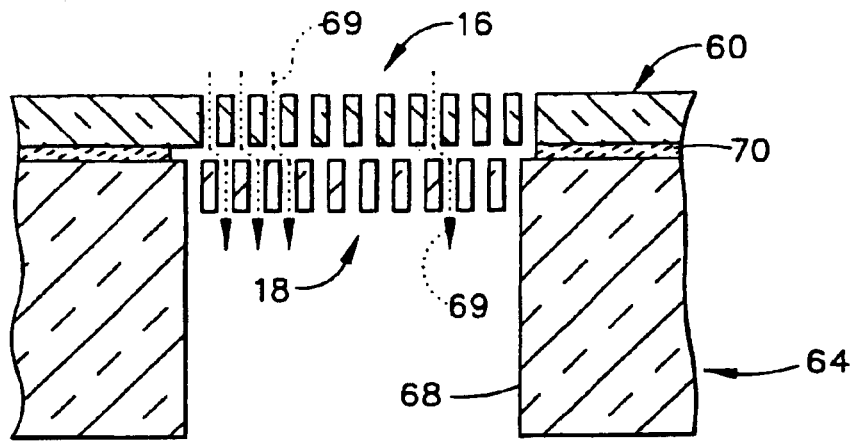
FIG. 10 is a schematic cross-sectional view of the wafers depicted in FIG. 9 when the microvalve is in the closed position.
Figure 11:
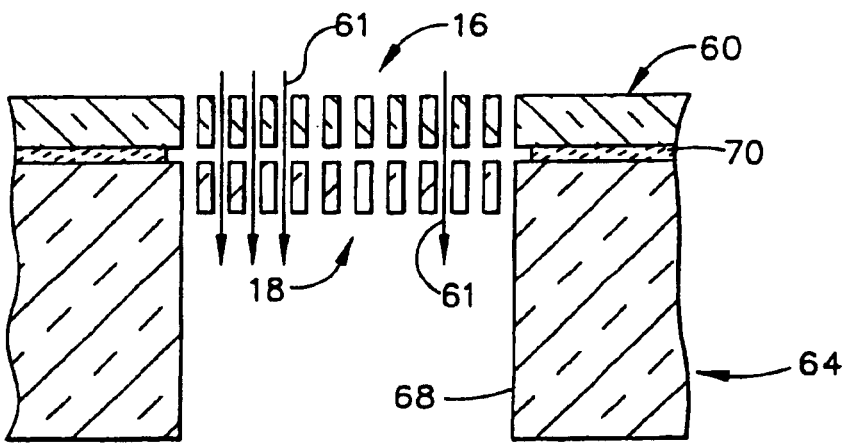
FIG. 11 a schematic cross-sectional view of the wafers depicted in FIG. 9 when the microvalve is in the open position.
Figure 12:
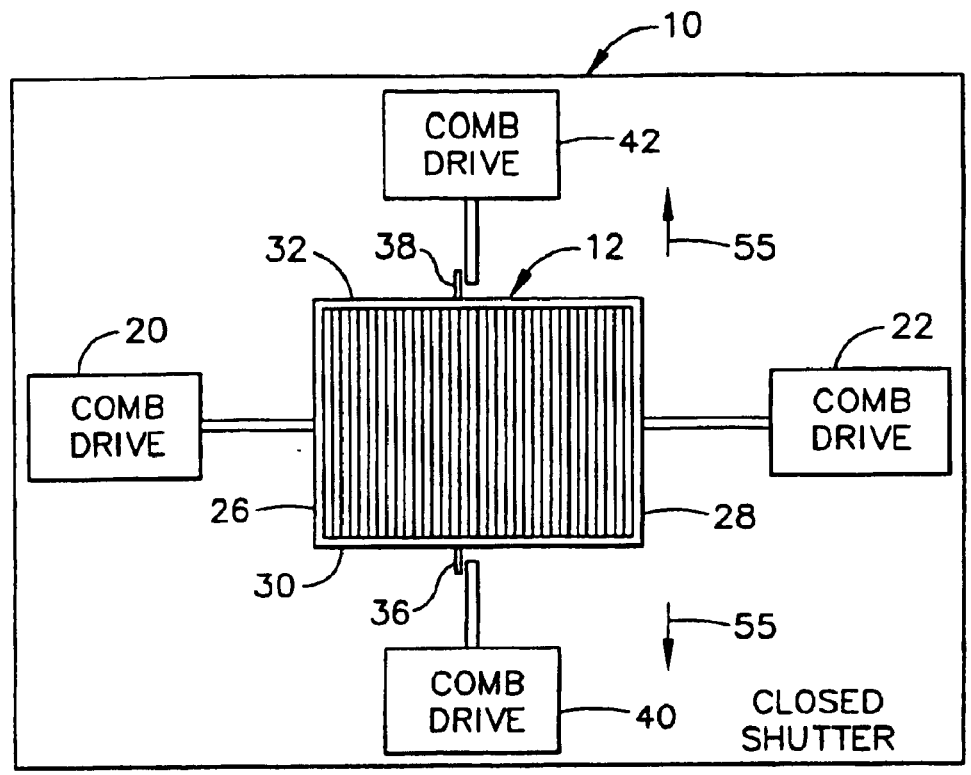
FIG. 12 is a schematic top view of the microvalve depicted in FIG. 1 when in the latched, closed position.

An alternative embodiment of the latching mechanism is shown in FIG. 5, where a shutter 50 similar to that described hereinabove forms the spine for a plurality of electrostatic comb drives 52. Accordingly, shutter 50 is moved laterally (in a substantially linear fashion) with respect to a body portion as ground fingers 54 are pulled to anchored fingers 56 in electrostatic comb drives 52 when a potential is applied therebetween. It will be seen that the latching mechanism for this embodiment preferably includes at least one electrostatic comb drive 58 positioned substantially perpendicular to shutter 50 so that it is able to engage and disengage the frame thereof and thereby frictionally prevent and permit shutter 50 from moving, respectively.

Figure 14:
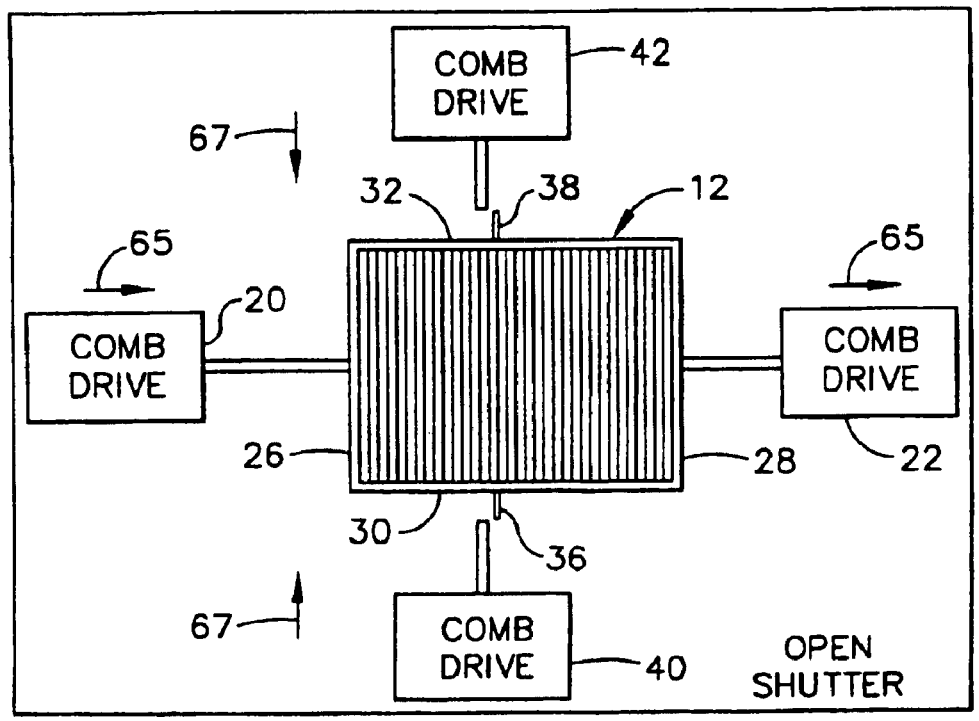
FIG. 14 is a schematic top view of the microvalve depicted in FIG. 1 when in the unlatched, open position.
Figure 15:
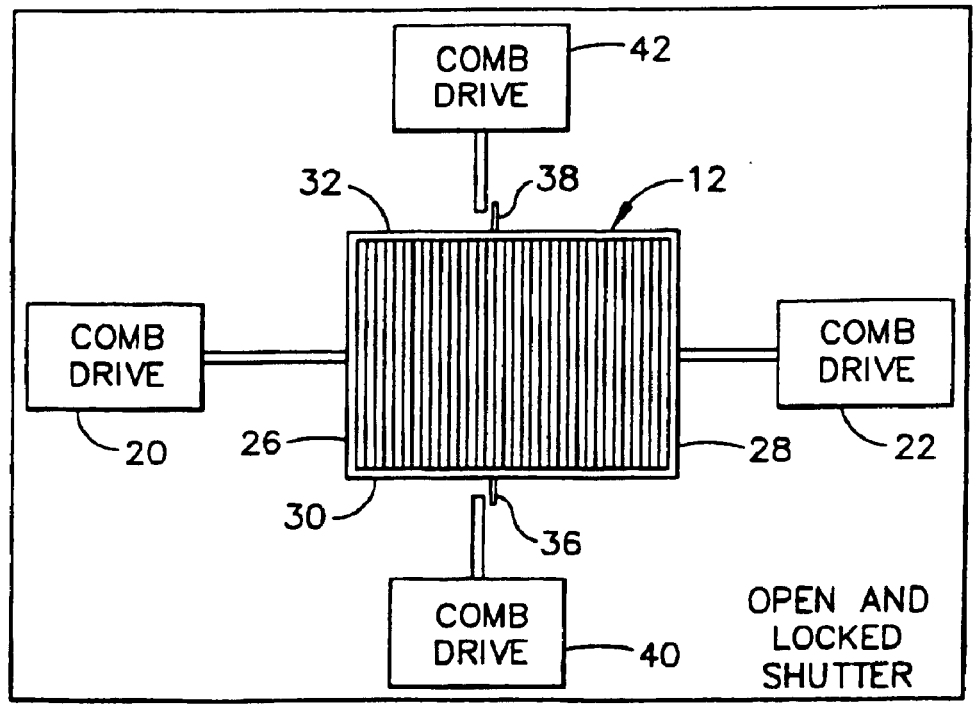
FIG. 15 is a schematic top view of the microvalve depicted in FIG. 1 when in the latched, open position.

In operation, it will be appreciated from FIGS. 12–15 that the method of electrostatically actuating microvalve 10 between a first (closed) position and a second (open) position preferably includes the steps of disengaging the latching mechanism (as indicated by arrows 55 in FIG. 12 and the relative positioning of the latching mechanism in FIG. 13) so as to permit movement of shutter 12 with respect to body portion 14, actuating a drive mechanism to move shutter 12 from the first position to the second position with respect to body portion 14 (as indicated by arrows 65 in FIG. 13 and the open position designation for shutter 12 in FIG. 14), and engaging the latching mechanism so as to prevent movement of shutter 12 from the second position (as indicated by arrows 67 in FIG. 14 and the relative positioning of the latching mechanism in FIG. 15). Further, the disengaging step preferably occurs immediately prior to and during movement of shutter 12 and the actuating step occurs only while the latching mechanism is disengaged.

In a preferred embodiment, shutter 12 is biased in a closed position so that the latching mechanism is utilized to prevent shutter 12 from moving when in the open position. Alternatively, shutter 12 may be biased in an open position so that the latching mechanism is utilized to prevent shutter 12 from moving when in the closed position. In this way, power to electrostatic comb drives 20 and 22 of the drive mechanism will need to be maintained only while moving shutter 12 in the unbiased direction. Of course, power to electrostatic comb drives 20 and 22 of the drive mechanism is maintained only while the latching mechanism is disengaged whether biasing of shutter 12 occurs or not.

Similarly, the latching mechanism is preferably biased in a closed or locked position. This has the desirable effect of requiring power only to disengage electrostatic comb drives 40 and 42. Consequently, it will be understood that power to the latching mechanism is preferably maintained only during a change in position of shutter 12 (see FIGS. 13 and 14).

In conjunction with a method of fabricating microvalve 10 described hereinafter, it will be appreciated from FIGS. 6–11 that shutter 12, electrostatic comb drives 20 and 22 of the drive mechanism, and electrostatic comb drives 40 and 42 of the latching mechanism are etched on a masking material 59 (preferably made of oxide) located at a top surface 62 of a first wafer 60. Body portion 14 is a second wafer 64 which has spaced openings 18 etched on a top surface 66 thereof, wherein a portion of second wafer 64 in substantial alignment with spaced openings 18 is etched therefrom so as to create a passage 68 in flow communication therewith (see FIG. 8). First and second wafers 60 and 64 are preferably constructed of a single crystal silicon. A sacrificial layer 70 is positioned between first and second wafers 60 and 64 to bond them together. It will be appreciated that sacrificial layer 70, preferably in the form of an oxide, may be attached to a bottom surface 63 of first wafer 60, top surface 66 of second wafer 64, or both. A portion of sacrificial layer 70 is removed in substantial alignment with flow passage 68 (see FIG. 9) so as to permit fluid flow (as depicted by arrows 61) through microvalve 10 when spaced openings 16 in first wafer 60 are aligned with spaced openings 18 in second wafer 64 (see FIG. 11). Otherwise, fluid flow through microvalve 10 is substantially prevented when spaced openings 16 and 18 are in substantial misalignment (see FIG. 10). It will be appreciated that a thickness t of sacrificial layer 70 is predetermined so that a designated leakage flow (as depicted by dashed arrows 69 in FIG. 10) through microvalve 10 is permitted when spaced openings 16 and 18 are in the closed position. Of course, shutter 12 may be moved to a position intermediate the open and closed positions (i.e., partial alignment of spaced openings 16 and 18) and mechanically or frictionally latched or held in place to permit partial opening of microvalve 10 and a proportional amount of fluid flow therethrough. In the mechanical latching design, this will typically entail either ears 36 and 38 being located asymmetrically along shutter frame 24 or providing additional ears on at least one side thereof.

It will be understood, then, that a method of fabricating an electrostatic microvalve like that described herein preferably involves the following steps: providing a first wafer 60 having top surface 62 and a bottom surface 63; providing a masking material 59 on top surface 62 of first wafer 60; providing a second wafer 64 having a top surface 66; etching a plurality of spaced openings 18 on a top surface 66 of second wafer 64; bonding a bottom surface 63 of first wafer 60 to top surface 66 of second wafer via a sacrificial layer 70; etching masking material 59 of first wafer 60 to create a shutter 12 and a driving mechanism (e.g., a plurality of electrostatic comb drives 20, 22, 40 and 42) operative therewith; etching a portion of second wafer 64 so as to create a passage 68 in flow communication with spaced openings 18 etched on top surface 66 thereof; and, removing a portion of sacrificial layer 70 between first and second wafers 60 and 64 to release the driving mechanism, as well as provide flow communication between spaced openings 16 and 18 of first and second wafers 60 and 64, respectively. It will be recognized from a comparison of FIGS. 6 and 7 that steps of thinning and polishing first wafer 60 to a predetermined thickness prior to the application of masking material 59 on first wafer 60 is preferred.

Figure 16:
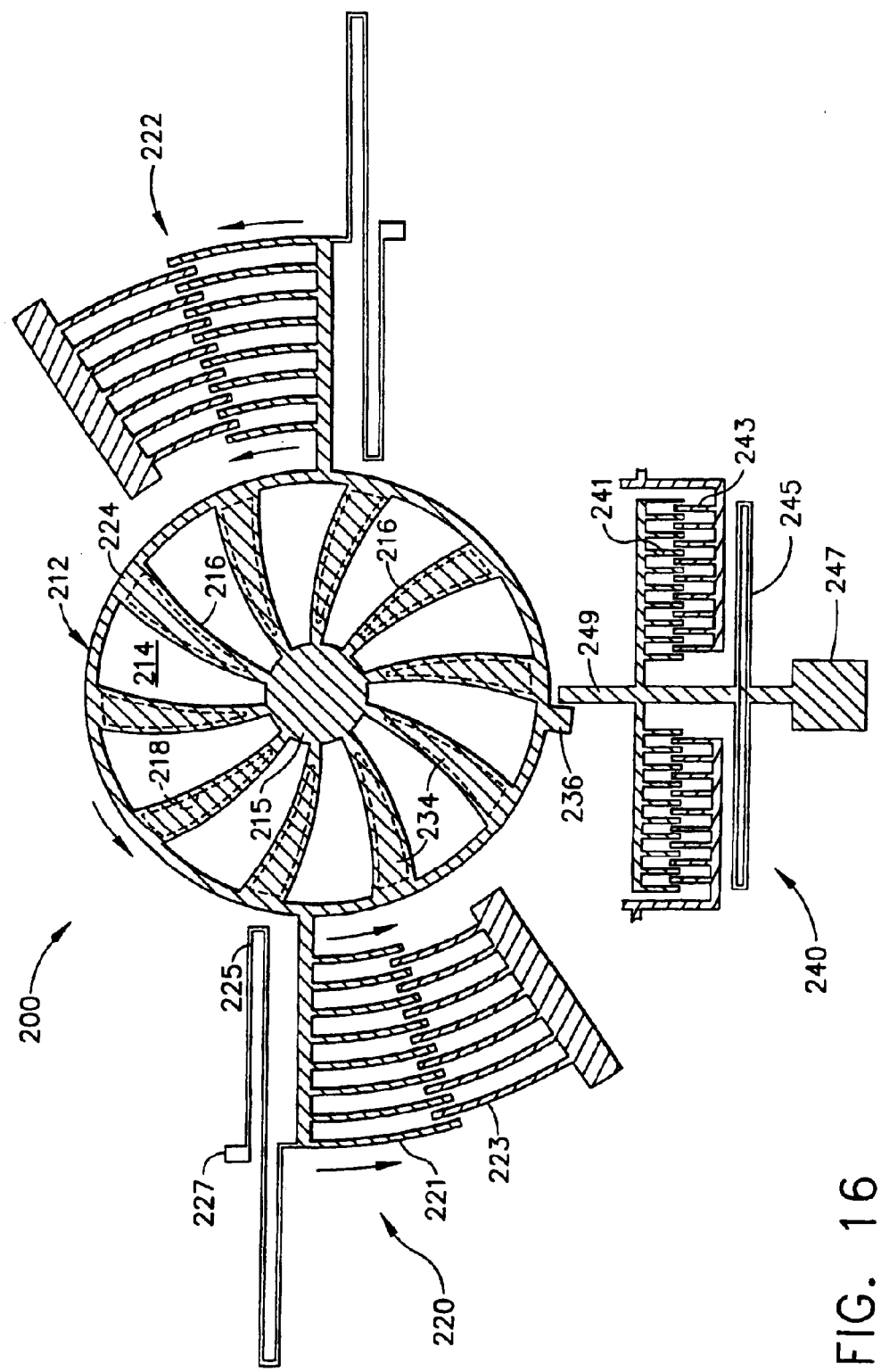
FIG. 16 is an enlarged, top view of a second embodiment for the microvalve of the present invention in the closed position.
Figure 17:
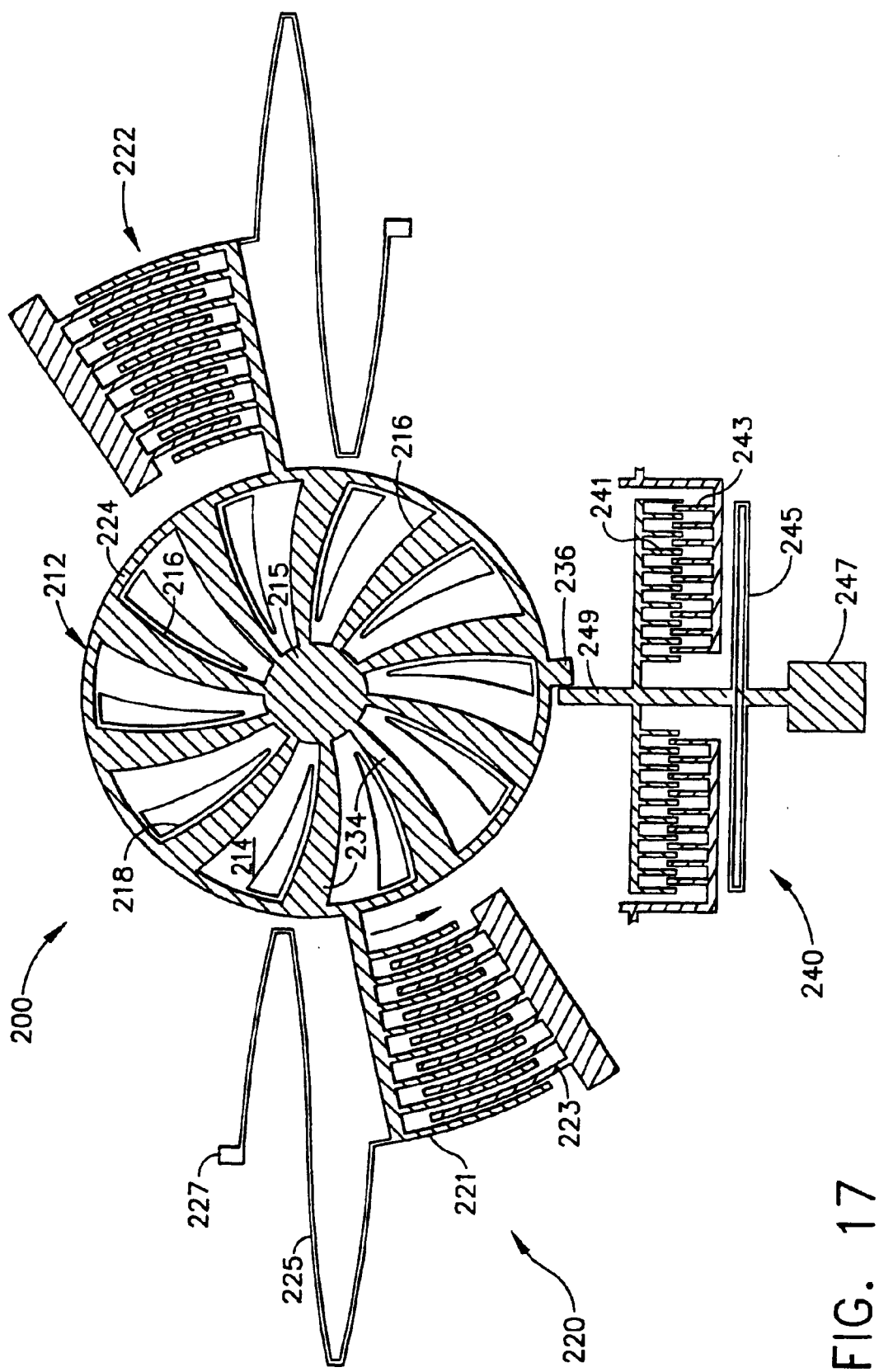
FIG. 17 is an enlarged, top view of the second microvalve embodiment depicted in FIG. 16 in the open position.

A second embodiment of the microvalve of the present invention, indicated generally by reference numeral 200, is depicted in FIG. 16. As seen therein, microvalve 200 is of the type where the lateral movement between a shutter 212 and a body portion 214 positioned in proximate location is non-linear (i.e., rotational). In particular, shutter 212 preferably has a substantially circular frame 224 with a center portion 215, although other symmetrical shapes may be utilized. It will be seen that shutter 212 has a plurality of spaced members 234 extending between frame 224 and center portion 215, with openings 216 provided therebetween. Members 234 are shown as having a curved configuration with openings 218 in body portion 214 being arranged so as to align with members 234 when microvalve 200 is in a closed position (preventing fluid flow) and to align with openings 216 when microvalve 200 is in an open position (permitting fluid flow). For their part, members 234 may have any desired shape (e.g., a straight spoke) in addition to that shown. Likewise, openings 218 in body portion 214 may involve openings having any desired shape, including small openings spaced closely together, slots, or any other design, providing they conform to the shape and arrangement of members 234 and openings 216 of shutter 212 (as shown in FIGS. 16 and 17).

With respect to the drive mechanism for microvalve 200, first and second comb drives 220 and 222 are connected to shutter 212 at opposite locations along frame 224. Since lateral movement of shutter 212 is intended to be non-linear, comb drives 220 and 222 each have suspended ground fingers 221 and anchored fingers 223 which are arcuate in design. In this way, ground fingers 221 are pulled to anchored fingers 223 when a potential is applied therebetween to create an electrostatic force and shutter 212 is caused to rotate. Although comb drives 220 and 222 are shown as causing shutter 212 to rotate counterclockwise, they may be altered to cause a clockwise rotation. A set of resilient beams 225 are provided at an anchored end 227 of each electrostatic comb drive 220 and 222 so as to suspend shutter 212 at frame 224. Accordingly, shutter 212 is able to move between the open and closed positions absent any friction forces thereon.

Microvalve 200 also includes a latching mechanism for preventing shutter 212 from moving laterally with respect to body portion 214. In one embodiment, the latching mechanism preferably includes at least one ear 236 extending from frame 224 and an electrostatic comb drive 240 positioned adjacent frame 224 which is movable so as to engage and disengage ear 236 and thereby mechanically prevent and permit shutter 212 from moving, respectively. Of course, additional ears and corresponding electrostatic comb drives may be utilized to further enhance the performance of the latching mechanism. It will be appreciated that electrostatic comb drive 240 is similar to electrostatic comb drive 40 described hereinabove, where it includes a plurality of suspended ground fingers 241 and a plurality of anchored fingers 243 so that ground fingers 241 are pulled to anchored fingers 243 when a potential is applied therebetween to create an electrostatic force. In this way, a beam 249 is brought into and out of engagement with ear 236. A set of resilient beams 245 are also provided at an anchored end 247 of electrostatic comb drive 240. Instead of engaging ear 236, the latching mechanism may involve beam 249 of electrostatic comb drive 240 merely providing a substantially perpendicular frictional force by engaging frame 224.

It will be understood that microvalve 200 will preferably be operated and fabricated like microvalve 10 as discussed in detail above, with the only changes being in the non-linear type of lateral movement between shutter 212 and body portion 214 and modifications to the actuators necessitated thereby. Likewise, shutter 212 may be biased in either the closed or open positions so that power to electrostatic comb drives 220 and 222 is preferably maintained only during movement of shutter 212 in one direction. Of course, this will occur only when the latching mechanism is disengaged. Likewise, the latching mechanism is preferably biased in a closed position so that power to electrostatic comb drive 240 is required only to disengage it. Clearly, then, power to the latching mechanism is maintained only during a change in position of shutter 212.

One aspect of the present invention is directed to an electrostatically-driven MEMS microvalve that may be used to control fluid (gas or liquid) flow into and/or out of a battery, a battery including such a valve, or a method of controlling fluid flow into and/or out of a battery. The battery may include, for example, one or more metal-air cells, one or more fuel cells, one or more voltaic cells, or a combination of these to produce a hybrid cell. In each case, the fluid flow enables or assists the provision of electrical power by providing a fluid cathode such as in the case of a metal-air cell, by providing a fluid anode in the case of a fuel cell, or by providing a fluid electrolyte such as in the case of a voltaic cell used in seawater.

Figure 18:
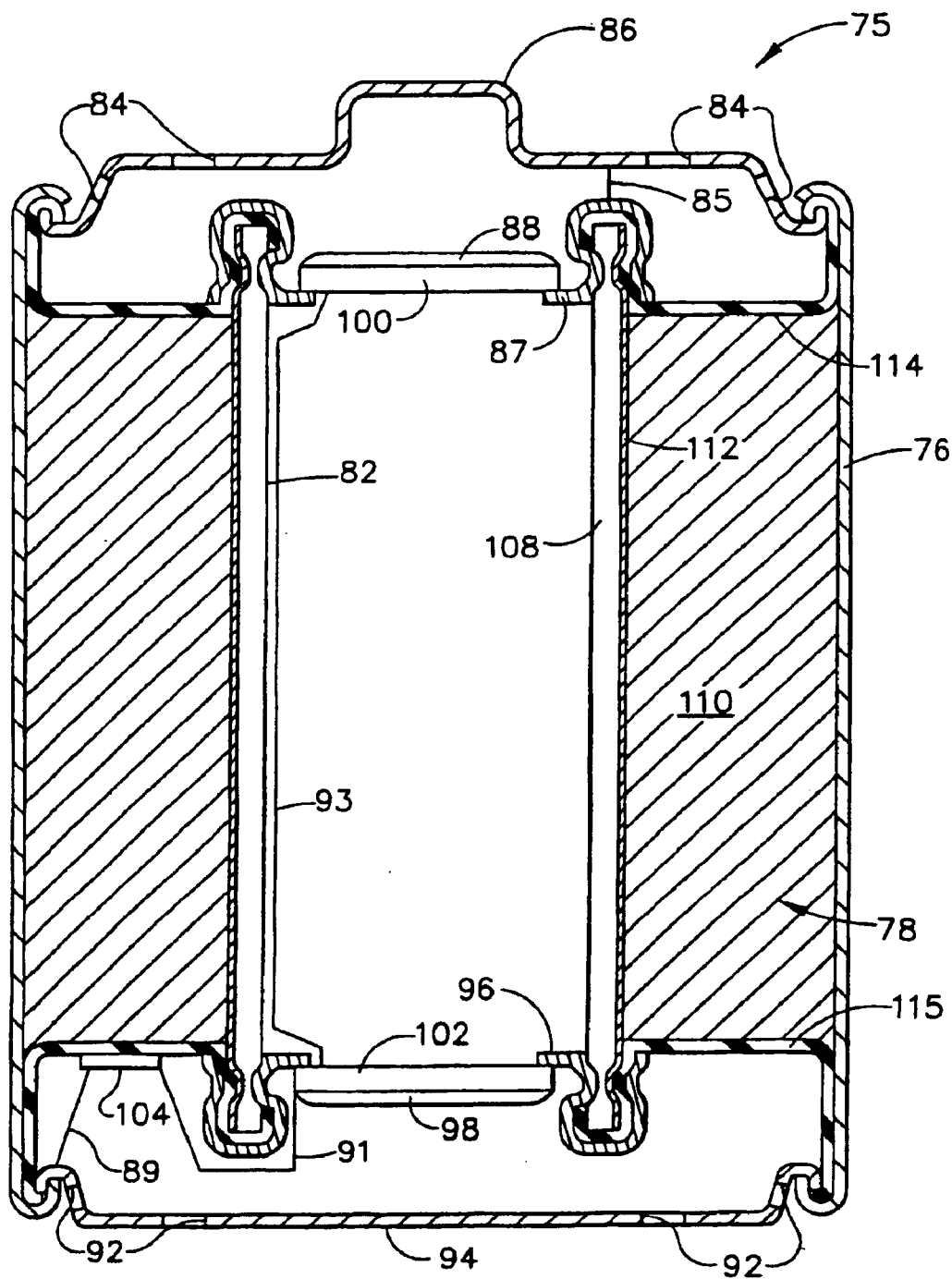
FIG. 18 is a schematic cross-sectional view of a metal-air battery including at least one microvalve of the present invention to control flow of air to the cells therein.
Figure 19:
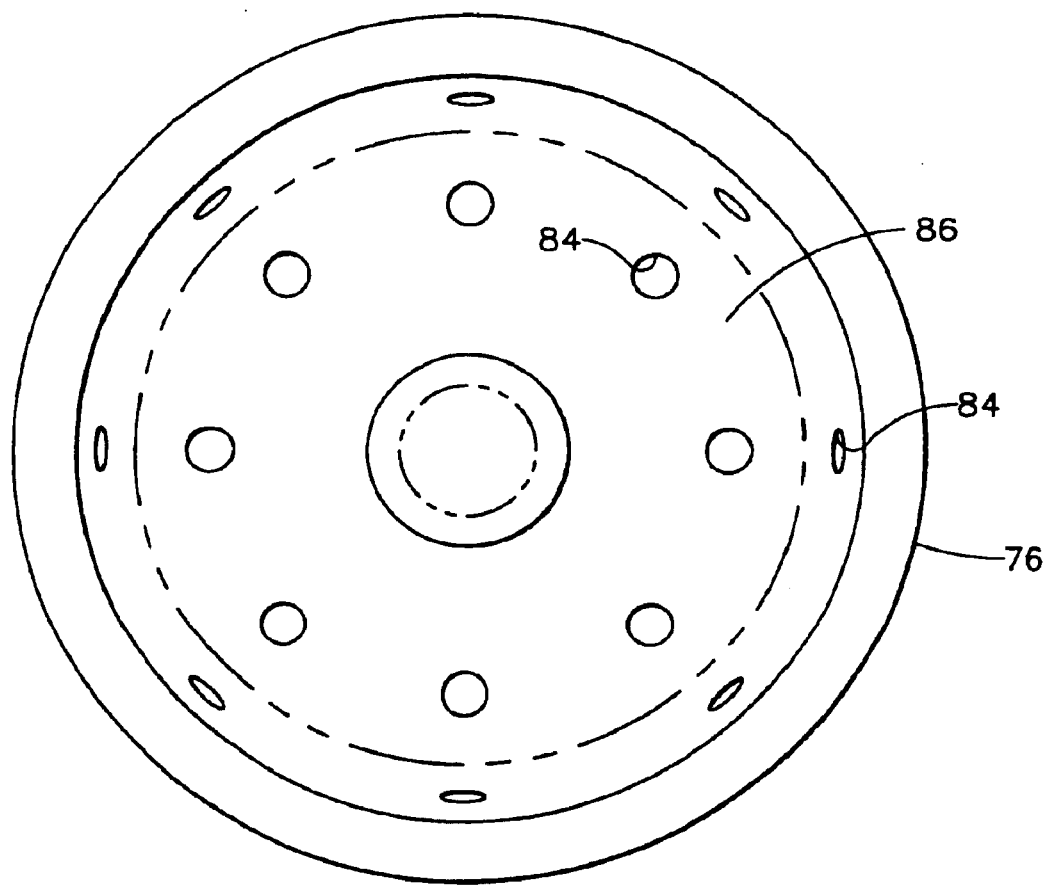
FIG. 19 is top plan view of an exemplary battery of the present invention.

FIGS. 18 and 19 show a cross-section of an exemplary fluid-breathing voltaic battery 75 having a container 76 and at least one voltaic cell 78 disposed within container 76. Container 76 may have a cylindrical shape as shown, a prismatic shape, or even a flat round shape (i.e., a button cell). A fluid exchange system for battery 75 includes at least one microvalve 100 of the present invention and a controller 104 electrically connected thereto to control the flow of fluid in battery 75. It will be understood that controller 104 is preferably like that described in a U.S. Pat. No. 6,074,775, entitled "Battery Having a Built-in Controller" and issued on Jun. 13, 2000, which is hereby incorporated by reference. Microvalve 100 may be located adjacent a top portion of an air path 82 in battery 75. Microvalve 100 is retained in position by a valve seat 87 (which also preferably includes a portion for crimping a top seal 114) and preferably has a hydrophobic layer 88 (e.g., polytetrafluoroethylene or polypropylene) located between it and openings 84 in a top metal cover 86 to diffuse air entering path 82. A plurality of openings 84 are preferably spaced circumferentially in top metal cover 86, in such quantities and size as needed for a desired air flow into battery 75.

A second microvalve 102 may be located adjacent a bottom portion of air path 82 so as to control air flow entering from openings 92 in a bottom metal cover 94. Microvalve 102 is likewise retained in position by a valve seat 96 (which, like valve seat 87, preferably includes a portion for crimping a bottom seal 115) and preferably has a hydrophobic layer 98 located between it and openings 92 to diffuse air entering path 82. While hydrophobic layers 88 and 98 are shown as being located on only one side of microvalves 100 and 102, several additional or alternative locations are also possible. For example, hydrophobic layers could be placed on both sides of each microvalve 100 and 102 in order to limit the flow of water vapor into or through each microvalve. Additionally, hydrophobic layers could be placed in substantial alignment with openings 84 and 92 in top and bottom metal covers 86 and 94, respectively. It will also be understood that materials for removing carbon dioxide could be incorporated in the same positions as the hydrophobic membranes.

Controller 104 is preferably positioned at the negative end of the cell since both positive and negative battery connections are readily accessible at this location. While controller 104 is preferably electrically connected to both microvalve 100 and microvalve 102 (and any other microvalves in battery 75), a separate controller for each microvalve may be utilized. A controller located at the positive end of the cell, however, would require a line to be run from the negative end of the cell to provide a negative connection. Several other alternative locations are possible for controller 104, including the inner surface of top or bottom metal covers 86 and 94, on top of valve seats 87 and 96, or even incorporated in microvalves 100 and 102 themselves.

It will be understood that connections are necessary between the positive and negative terminals of battery 75, microvalves 100 and 102, and controller 104. Of course, valve seats 87 and 96 for microvalves 100 and 102, respectively, are preferably metal assemblies which carry the positive battery charge. A wire connection 85 is preferably provided between top metal cover 86 and valve seat 87, because lowering top metal cover 86 and spot welding it to valve seat 87 could inhibit air flow from openings 84 to air path 82 unless additional measures were taken (i.e., if openings in top metal cover 86 were located in a middle region above hydrophobic layer 88 or if top metal cover 86 was constructed from a metal screen, perforated metal, or expanded metal). Wire connections 89, 91 and 93 are then provided between the negative terminal for battery 75 and controller 104, between controller 104 and microvalve 102, and between microvalve 102 and microvalve 100, respectively.

It will be appreciated that additional microvalves, preferably in the form of an array, may be positioned within battery 75 as an alternative manner of controlling the amount of air entering therein. In this way, the amount of airflow (dependent upon the number of microvalves open) permitted to flow therein is able to provide a high current rate without continued exposure to ambient air after the load has been removed. Since the microvalves for such an array can be of a bi-stable design (i.e., open or closed), this is an attractive alternative to having microvalve 100 and/or microvalve 102 be only partially open. Although not shown, one or more microvalves for battery 75 may be located adjacent a periphery of container 76.

The terms "electrically connected" and "electrical connection" refer to connections that allow for continuous current flow. The terms "electronically connected" and "electronic connection" refer to connections in which an electronic device such as a transistor or a diode are included in the current path. "Electronic connections" are considered in this application to be a subset of "electrical connections" such that while every "electronic connection" is considered to be an "electrical connection," not every "electrical connection" is considered to be an "electronic connection."

It will further be seen that voltaic cell 78 of battery 75 preferably includes an air cathode 108, a metal anode 110, and a separator 112 therebetween. Seals 114 and 115 of an insulating material are provided at each end of voltaic cell 78, with top valve seat 87 being in contact with air cathode 108. Another hydrophobic layer may be located between air path 82 and air cathode 108 if necessary. Of course, other battery configurations may employ the microvalves described herein, including one where the anode is a cylindrical plug in the center of the cell surrounded by an air cathode on the outside. Another alternative design involves the anode and air cathode being configured in a spiral or "jelly roll" configuration. It will be understood that other modifications may be required in order to employ these alternative battery designs, such as including an air channel between the container and the air cathode and having openings formed in a side portion of the case instead of the ends.

Controller 104 individually, or in conjunction with a second controller, is preferably utilized to open and/or close microvalves 100 and 102. The term "controller" as used in this application refers to a circuit that accepts at least one input signal and provides at least one output signal that is a function of the input signal. Controller 104 may monitor and/or manage fluid flow between a metal-air electrochemical cell and the external environment. For example, controller 104 may allow air into voltaic cell 78 when oxygen is required to provide the current required by the load. When the load is disconnected or demands only a minimal amount of current, controller 104 may close or partially close microvalves 100 and 102 so that the reaction in voltaic cell 78 is stopped or slowed down and the cell electrolyte is protected until the load demands more current. At that time, controller 104 may open microvalve 100 so that voltaic cell 78 will generate the current demanded by the load. In this regard, it will also be appreciated that voltaic cell 78 preferably provides power to microvalves 100 and 102 and is able to do so due to the leakage flow therethrough even when in the closed position. Optimally, controller 104 and/or a second controller will provide signal conditioning to the power provided by voltaic cell 78 to drive microvalves 100 and 102.

Controller 104 may also be used to perform other functions to further increase the operation efficiency and/or safety of one or more electrochemical cells in addition to controlling fluid flow into and/or out of one or more electrochemical cells. Examples of operations that may be performed by controller 104 include: using a DC/DC converter to extend the service run time of the battery; controlling a charge cycle of the electrochemical cell by directly monitoring the electrochemical properties of that particular cell; providing a safety disconnect in the event of overheating, inverse polarity, short-circuit, over-pressure, overcharge, over-discharge or excessive hydrogen generation; and, monitoring the state of charge of that particular electrochemical cell to provide this information to the user, the device, or for quality assurance purposes. Functions such as these are described in detail in U.S. Pat. Nos. 6,074,775 and 6,163,131, each entitled "Battery Having a Built-in Controller", which are both incorporated by reference in this application.

While particular embodiments and/or individual features of the present invention have been illustrated and described, it would be obvious to those skilled in the art that various other changes and modifications can be made without departing from the spirit and scope of the invention. Further, it should be apparent that all combinations of such embodiments and features are possible and can result in preferred executions of the invention.

What is claimed is:

1. A fluid-breathing voltaic battery, comprising:
   (a) a container;
   (b) a voltaic cell disposed within said container; and
   (c) a fluid exchange system comprising:
      (1) a microvalve having a first state and a second state, said microvalve being disposed in said container such that said microvalve as located between a fluid flow and said cell, wherein said microvalve is adapted to allow a fluid into said cell when said microvalve is in said first state and to substantially prevent said fluid from flowing into said cell when said microvalve is in said second state;

(2) a controller electrically connected to said microvalve, said controller being adapted to initiate a change of state in said microvalve; and (3) a latching mechanism for retaining said microvalve in one of said first and second states.

(d) wherein said microvalve comprises:

(1) a body portion having a plurality of spaced openings formed therein;

(2) a wafer located adjacent and substantially parallel with said body portion, said wafer comprising a shutter integral thereto, said shutter having a plurality of spaced openings formed therein;

(3) said wafer further comprising a drive mechanism integral thereto for causing said shutter to move with respect to said body portion so that said spaced openings of said shutter are brought into and out of alignment with said spaced openings of said body portion, said drive mechanism being electrically connected to said controller; and, wherein said wafer further comprises said latching mechanism.

2. The fluid-breathing voltaic battery of claim 1, wherein said first state is an open position and said second state is a closed position.

3. The fluid-breathing voltaic battery of claim 2, wherein said shutter is biased in said closed position.

4. The fluid-breathing voltaic battery of claim 3, wherein said latching mechanism is utilized to prevent said shutter from moving when in said open position.

5. The fluid-breathing voltaic battery of claim 2, wherein said shutter is biased in said open position.

6. The fluid-breathing voltaic battery of claim 5, wherein said latching mechanism is utilized to prevent said shutter from moving when in said closed position.

7. The fluid-breathing voltaic battery of claim 1, wherein said shutter further comprises:

(a) a substantially circular frame having a center portion; and, (b) a plurality of spaced members extending between said center portion and said frame defining said spaced openings therebetween.

8. The fluid-breathing voltaic battery of claim 7, said latching mechanism further comprising:

(a) an ear extending from said frame; and, (b) an electrostatic comb drive position adjacent said frame proximate said ear, wherein said electrostatic comb drive is movable so as to engage and disengage said ear and thereby prevent and permit said shutter from moving, respectively.

9. The fluid-breathing voltaic battery of claim 7, said latching mechanism further comprising at least one electrostatic comb drive position adjacent said frame, wherein said electrostatic comb drive is movable so as to engage and disengage said shutter frame and thereby prevent and permit said shutter from moving, respectively.

10. The fluid-breathing voltaic battery of claim 7, wherein said drive mechanism is an electrostatic comb drive attached to said frame.

11. The fluid-breathing voltaic battery of claim 1, wherein power to disengage said latching mechanism is maintained only during a change in position of said shutter.

12. The fluid-breathing voltaic battery of claim 1, wherein power to said drive mechanism is maintained only while said latching mechanism is disengaged.

13. The fluid-breathing voltaic battery of claim 1, wherein said shutter is movable to a position intermediate said open position and said closed position so as to permit a partial opening of said microvalve.

14. The fluid-breathing voltaic battery of claim 1, wherein said drive mechanism causes said shutter to move linearly with respect to said body portion and said latching mechanism prevents said shutter from moving with respect to body portion.

15. The fluid-breathing voltaic battery of claim 1, wherein said drive mechanism causes said shutter to move non-linearly with respect to said body portion and said latching mechanism prevents said shutter from moving with respect to said body portion.

16. The fluid-breathing voltaic battery of claim 1, wherein a predetermined amount of fluid is able to leak through said microvalve in said second state.

* * * * *